United States Patent
Miyazoe et al.

(10) Patent No.: US 10,823,299 B2
(45) Date of Patent: Nov. 3, 2020

(54) INTEGRATED MULTIPLE VALVE MANIFOLD

(71) Applicant: SMC CORPORATION, Chiyoda-ku (JP)

(72) Inventors: Shinji Miyazoe, Moriya (JP); Kazuhiro Noguchi, Tsukubamirai (JP)

(73) Assignee: SMC CORPORATION, Chiyoda-ku (JP)

(*) Notice: Subject to any disclaimer, the term of this patent is extended or adjusted under 35 U.S.C. 154(b) by 52 days.

(21) Appl. No.: 15/735,221

(22) PCT Filed: Jun. 20, 2016

(86) PCT No.: PCT/JP2016/068197
§ 371 (c)(1),
(2) Date: Dec. 11, 2017

(87) PCT Pub. No.: WO2016/208521
PCT Pub. Date: Dec. 29, 2016

(65) Prior Publication Data
US 2018/0135766 A1 May 17, 2018

(30) Foreign Application Priority Data
Jun. 24, 2015 (JP) .................. 2015-126841

(51) Int. Cl.
F16K 11/22 (2006.01)
F16K 11/07 (2006.01)
(Continued)

(52) U.S. Cl.
CPC .......... F16K 11/22 (2013.01); F15B 13/0807 (2013.01); F15B 13/0814 (2013.01);
(Continued)

(58) Field of Classification Search
CPC ........ F16K 11/22; F16K 11/207; F16K 11/07; F16K 27/041; F16K 27/048; F16K 31/0613; F15B 13/0814; F15B 13/0842
See application file for complete search history.

(56) References Cited

U.S. PATENT DOCUMENTS 3,771,565 A * 11/1973 Padula ................ F15B 13/0431
137/625.64
3,896,856 A * 7/1975 Schumacher ........... F16K 11/07
137/625.65
(Continued)

FOREIGN PATENT DOCUMENTS

JP 5-22803 U 3/1993
JP 7-208627 A 8/1995
(Continued)

OTHER PUBLICATIONS

International Search Report dated Sep. 6, 2016 in PCT/JP2016/068197 filed Jun. 20, 2016.

Primary Examiner — Seth W. Mackay-Smith
(74) Attorney, Agent, or Firm — Oblon, McClelland, Maier & Neustadt, L.L.P.

(57) ABSTRACT

An integrated multiple valve manifold that is reduced in size and weight by integrally incorporating a plurality of valve mechanisms in one manifold. The one manifold, which is formed of an extruded material through which a fluid supply hole and fluid discharge holes extend, includes a plurality of valve holes each of which communicates with the fluid supply hole and the fluid discharge holes by directly intersecting both of the fluid supply hole and the fluid discharge holes, output ports that are formed so as to individually communicate with the valve holes, spools that are slidably inserted into the valve holes, and electromagnetic pilot valves that are individually attached to one ends or both ends of the valve holes.

5 Claims, 8 Drawing Sheets

(51) Int. Cl.
   *F16K 27/00* (2006.01)
   *F16K 13/08* (2006.01)
   *F16K 27/04* (2006.01)
   *F15B 13/08* (2006.01)

(52) U.S. Cl.
   CPC ...... *F15B 13/0842* (2013.01); *F15B 13/0871* (2013.01); *F16K 11/07* (2013.01); *F16K 27/003* (2013.01); *F16K 27/041* (2013.01); *F16K 27/048* (2013.01)

(56) References Cited

U.S. PATENT DOCUMENTS

| | | | | |
|---|---|---|---|---|
| 4,406,307 A * | 9/1983 | Loup | | F15B 13/0402 137/625.65 |
| 5,529,088 A * | 6/1996 | Asou | | F15B 13/0825 137/343 |
| 5,603,355 A * | 2/1997 | Miyazoe | | F15B 13/0853 137/625.64 |
| 5,666,994 A * | 9/1997 | Stoll | | F15B 13/0839 137/596.16 |
| 5,718,263 A * | 2/1998 | Sato | | F15B 13/0402 137/271 |
| 5,771,918 A * | 6/1998 | Fukano | | F15B 13/0817 137/269 |
| 5,924,439 A * | 7/1999 | Miyazoe | | F15B 13/0402 137/269 |
| 5,929,536 A * | 7/1999 | Stoll | | F15B 13/0814 307/139 |
| 5,944,056 A * | 8/1999 | Miyazoe | | F16K 27/003 137/625.64 |
| 5,996,623 A * | 12/1999 | Omberg | | F15B 13/0402 137/596.13 |
| 6,026,856 A * | 2/2000 | Miyazoe | | F15B 13/0402 137/596.16 |
| 6,167,762 B1 * | 1/2001 | Miyazoe | | G01L 19/0007 73/756 |
| 6,283,149 B1 * | 9/2001 | Hayashi | | F15B 13/0402 137/554 |
| 6,612,332 B2 * | 9/2003 | Miyazoe | | F15B 13/0431 137/552 |
| 6,766,828 B2 * | 7/2004 | Takada | | F15B 13/0402 137/557 |
| 7,252,115 B2 * | 8/2007 | Miyazoe | | F15B 13/0817 137/271 |
| 7,591,280 B2 * | 9/2009 | Narita | | F15B 13/0814 137/269 |
| 7,827,785 B2 * | 11/2010 | Messerlie | | F16K 49/00 60/329 |
| 9,004,105 B2 * | 4/2015 | Bruck | | F16K 11/0716 137/625.68 |
| 9,341,274 B2 * | 5/2016 | Miyazoe | | F16K 11/0716 |
| 10,174,771 B2 * | 1/2019 | Miyazoe | | F16K 31/383 |
| 10,371,272 B2 * | 8/2019 | McMiles | | F15B 13/028 |
| 2012/0255617 A1 * | 10/2012 | Miyazoe | | F15B 13/0402 137/1 |
| 2015/0059893 A1 * | 3/2015 | Nishiyama | | F16K 11/10 137/596.1 |

FOREIGN PATENT DOCUMENTS

| | | |
|---|---|---|
| JP | 9-229226 A | 9/1997 |
| JP | 10-325483 A | 12/1998 |

* cited by examiner

INTEGRATED MULTIPLE VALVE MANIFOLD

TECHNICAL FIELD

The present invention relates to an integrated multiple valve manifold in which a plurality of valve mechanisms are incorporated in one manifold.

BACKGROUND ART

To date, when using a set of valves for controlling pressure fluid, as disclosed in PTL 1, a manifold valve is formed by mounting a necessary number of valves in a single-type manifold, which is structured to allow a plurality of valves to be mounted therein, and the manifold valve has been used as an integrated multiple valve manifold. In this case, the valves are individually fixed to the manifold via gaskets by using bolts.

Therefore, the entirety of the finished manifold valve, in which the manifold and the valves that have been individually formed are joined, has a considerably large size. Moreover, the weight of the manifold valve is considerably large due to the addition of the gaskets and the bolts.

In recent years, there have been an increasing number of cases where a set of valves are mounted in a movable portion of an industrial robot, a transport device, or the like. The aforementioned manifold valve is used in such a case.

However, the existing manifold valve, which has considerably large size and weight as described above, has a problem in that a large installation space is necessary and a high mechanical load and energy-related load is applied to the movable portion. Therefore, in view of reduction a mechanical load on the movable portion and conservation of energy, it is desirable to provide a manifold valve that is maximally reduced in size and weight.

In PTL 2, a valve system in which a plurality of valve elements are incorporated in one valve body is disclosed. The valve system, in which the valve elements are attached to attachment holes formed in the valve body, is reduced in size and weight compared with the manifold valve disclosed in PTL 1.

However, in the valve system, oil-passage-forming members, which are independent from the valve body, are stacked and fixed to both surfaces of the valve body so as to form oil passages between the valve body and the oil-passage-forming members; and a cover member is superposed on and fixed to an outer surface of one of the oil-passage-forming members, and joints for connecting pipes are formed in the cover member. Therefore, a method of forming the oil passages and the joints is complex, and the valve system is not sufficiently reduced in size and weight.

CITATION LIST

Patent Literature

PTL 1: Japanese Unexamined Patent Application Publication No. 7-208627
PTL 2: Japanese Unexamined Patent Application Publication No. 10-325483

SUMMARY OF INVENTION

Technical Problem

A technological object of the present invention is to form an integrated multiple valve manifold that is further reduced in size and weight compared with existing products by integrally incorporating a plurality of valve mechanisms in one manifold.

Solution to Problem

In order to achieve the object, according the present invention, there is provided an integrated multiple valve manifold including: a manifold that is formed of an extruded material through which a fluid supply hole and a fluid discharge hole extend, the manifold having a longitudinal direction in which the fluid supply hole and the fluid discharge hole extend, a transverse direction perpendicular to the longitudinal direction, and a vertical direction perpendicular to both of the longitudinal direction and the transverse direction; a plurality of valve holes that extend through the manifold in the transverse direction, each of the plurality of valve holes communicating with the fluid supply hole and the fluid discharge hole by directly intersecting both of the fluid supply hole and the fluid discharge hole; output ports that are formed in at least one of an upper surface and a lower surface of the manifold so as to individually communicate with the plurality of valve holes; spools that are slidably inserted into the valve holes and switch flow paths that connect the output ports, the fluid supply hole, and the fluid discharge hole; and electromagnetic pilot valves that are individually attached to one ends or both ends of the valve holes to drive the spools.

In the present invention, preferably, the fluid supply hole and the fluid discharge hole are formed at positions that are different from each other in the vertical direction of the manifold, each have a non-circular cross-sectional shape, each include a long hole portion having a constant hole width in a part of a cross section; and the long hole portion of the fluid supply hole and the long hole portion of the fluid discharge hole extend opposite to each other in the vertical direction of the manifold, and intersect the valve holes from directions vertically opposite to each other.

Vertical lengths of portions where the long hole portions of the fluid supply hole and the fluid discharge hole intersect each of the valve holes are each smaller than an inside diameter of the valve hole. At positions where the long hole portions of the fluid supply hole and the fluid discharge hole intersect each of the valve holes, arc-shaped recesses having a diameter larger than the inside diameter of the valve hole are formed so as to be coaxial with the valve hole.

According to a specific aspect of the present invention, the pilot valves are attached to a side surface of the manifold via adapter plates, the adapter plates include drive pistons that are in contact with one ends of the spools and drive pressure chambers that cause pilot fluid to act on the drive pistons, and the drive pressure chambers are connected to the fluid supply hole via the pilot valves.

According to another specific aspect of the present invention, end plates are attached to the other ends of the valve holes to only one ends of which the pilot valves are attached, the end plates include recovery pistons that are in contact with the other ends of the spools and recovery chambers that cause pilot fluid to act on the recovery pistons, the recovery pistons have a diameter smaller than a diameter of the drive pistons, and the recovery pressure chambers always communicate with the fluid supply hole.

Advantageous Effects of Invention

With to the present invention, it is possible to obtain an integrated multiple valve manifold that is further reduced in size and weight compared with existing products, because, in one manifold through which a fluid supply hole and a fluid discharge hole extend, a plurality of valve holes are formed so as to directly intersect the fluid supply hole and the fluid discharge holes, spools are inserted into the valve holes, and pilot valves and the like for driving the spools are attached to the manifold.

DESCRIPTION OF EMBODIMENTS

Figure 8:
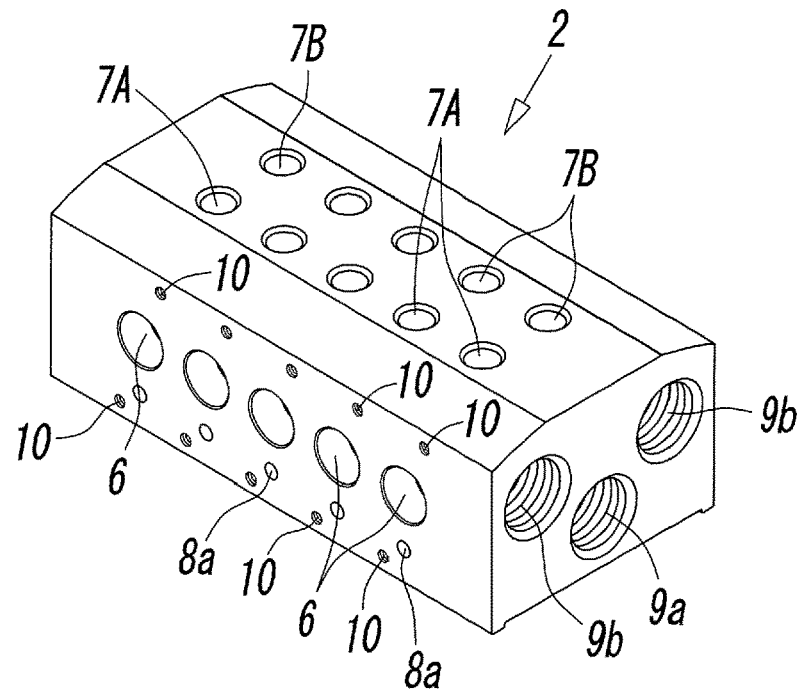
FIG. 8 is a perspective view of a manifold formed by machining the block body shown in FIG. 6.
Figure 9:
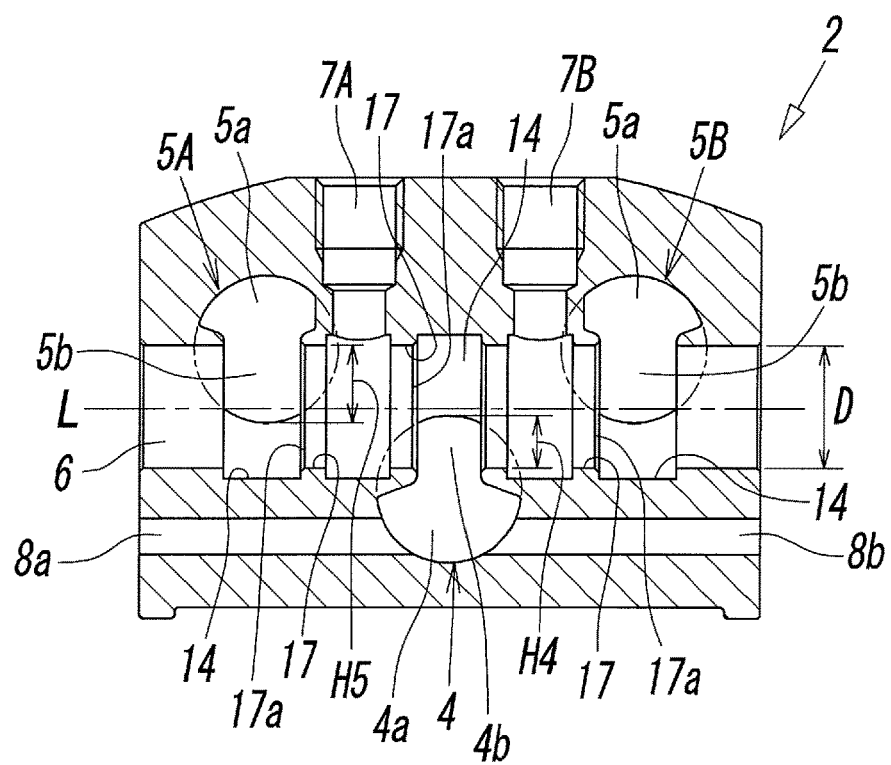
FIG. 9 is a sectional view of FIG. 8.

FIGS. 1 to 5 illustrate an integrated multiple valve manifold according to a first embodiment of the present invention. In a manifold valve 1A according to the first embodiment, a plurality of valve mechanisms 3A for controlling pressure fluid, such as compressed air, are integrally incorporated in one manifold 2 that is formed as illustrated in FIGS. 8 and 9. The example illustrated in the figures is a quintuple manifold valve in which five sets of valve mechanisms 3A are incorporated in the manifold 2. The five sets of valve mechanisms 3A are all single-solenoid-type five-port valves that have the same structure.

Figure 6:
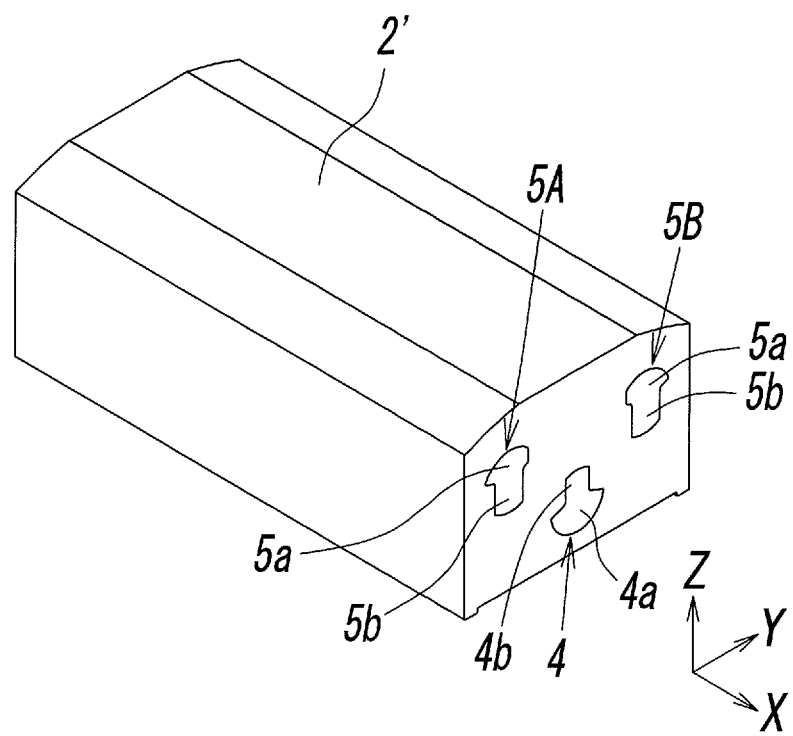
FIG. 6 is a perspective view of a block body before forming a manifold.
Figure 7:
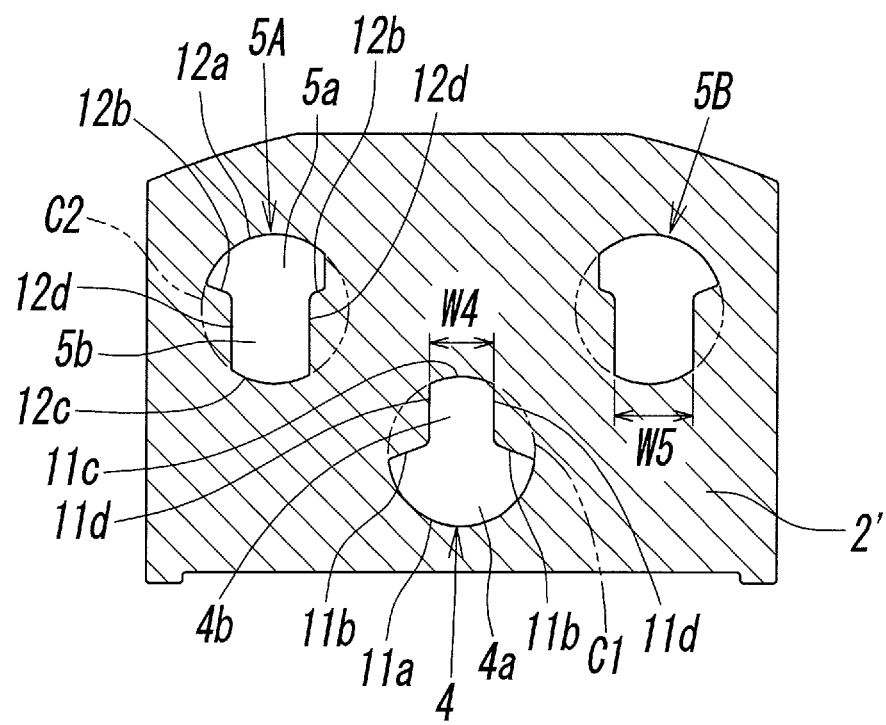
FIG. 7 is a sectional view of FIG. 6.

The manifold 2 is formed by performing necessary machining on a block body 2' illustrated in FIGS. 6 and 7. The block body 2' is formed by cutting an extruded material made of a metal (such as an aluminium alloy) into a length that is necessary for incorporating a necessary number of valve mechanisms 3A. A fluid supply hole 4 and fluid discharge holes 5A and 5B have been formed in the he block body 2' beforehand. As illustrated in FIGS. 8 and 9, the manifold 2 is formed by forming, in accordance with the number of the valve mechanisms 3A to be incorporated, a plurality of valve holes 6, output ports 7A and 7B, pilot supply holes 8a and 8b, pipe connection holes 9a and 9b, screw holes 10, and the like in the block body 2'.

As illustrated in FIG. 6, the block body 2' has a longitudinal direction (X direction) that is the extrusion direction of the extruded material, a transverse direction (Y direction) perpendicular to the longitudinal direction, and a vertical direction (Z direction) perpendicular to the longitudinal direction and the transverse direction. One fluid supply hole 4, for supplying pressure fluid to all of the valve mechanisms 3A, and two fluid discharge holes 5A and 5B, for discharging discharge fluid from all of the valve mechanisms 3A to the outside, straightly extend through the block body 2' in the longitudinal direction.

As is clear from FIG. 7, the fluid supply hole 4 is disposed at the center of the block body 2' in the transverse direction, and the two fluid discharge holes 5A and 5B are disposed on both sides of the fluid supply hole 4. The fluid supply hole 4 and the fluid discharge holes 5A and 5B are formed at different positions in the block body 2' in the vertical direction. The fluid supply hole 4 is formed at a position lower than the two fluid discharge holes 5A and 5B, and the two fluid discharge holes 5A and 5B are formed at positions that are substantially the same as each other.

The fluid supply hole 4 and the fluid discharge holes 5A and 5B are non-circular holes and have main hole portions 4a and 5a and long hole portions 4b and 5b. The cross sectional shapes of the fluid discharge holes 5A and 5B are the same as each other or are symmetrical in the left-right direction.

Among these, the main hole portion 4a of the fluid supply hole 4 is a portion that is surrounded by an arc-shaped wall 11a, which is a part of an imaginary cylindrical surface C1, and two side walls 11b, which extend in radial directions from both ends of the arc-shaped wall 11a. The long hole portion 4b is a portion that is surrounded by an arc-shaped wall 11c, which is a part of the imaginary cylindrical surface C1, and two side walls 11d that are parallel to each other. The long hole portion 4b has a constant hole width W4 and is shaped like a narrow long hole. The arc-shaped wall 11a and the arc-shaped wall 11c are parts of the imaginary cylindrical surface C1 that are positioned opposite to each other in a diametrical direction. Accordingly, the main hole portion 4a and the long hole portion 4b are straightly continuous in the diametrical direction of the imaginary cylindrical surface C1. The hole width W4 of the long hole portion 4b is narrower than the maximum hole width of the main hole portion 4a.

The main hole portion 5a of each of the fluid discharge holes 5A and 5B is a portion that is surrounded by an arc-shaped wall 12a, which is a part of an imaginary cylindrical surface C2, and two side walls 12b, which are continuous with both ends of the arc-shaped wall 12a. The long hole portion 5b is a portion that is surrounded by an arc-shaped wall 12c, which is a part of the imaginary cylindrical surface C2, and two side wall 12d that are parallel to each other. The long hole portion 5b has a constant hole width W5 and is shaped like a narrow long hole. The main hole portion 5a and the long hole portion 5b are continuous in a diametrical direction of the imaginary cylindrical surface C2. The arc-shaped wall 12a and the arc-shaped wall 12c are positioned opposite to each other in the diametrical direction of the imaginary cylindrical surface C2.

The imaginary cylindrical surfaces C1 and C2 have the same diameter. The hole widths W5 of the long hole portions 5b of the two fluid discharge holes 5A and 5B are equal to each other. The hole width W4 of the long hole portion 4b of the fluid supply hole 4 is equal to or smaller than the hole widths W5 of the long hole portions 5b of the fluid discharge holes 5A and 5B.

The long hole portion 4b of the fluid supply hole 4 and the long hole portions 5b of the fluid discharge holes 5A and 5B extend in the block body 2' in the vertical direction opposite to each other and parallel to each other. That is, the long hole portion 4b of the fluid supply hole 4 extends upward in the block body 2'. The long hole portions 5b of the fluid discharge holes 5A and 5B extend downward in the block body 2'. An end (lower end) of the long hole portion 4b of the fluid supply hole 4 and ends (upper ends) of the long hole portions 5b of the fluid discharge holes 5A and 5B occupy substantially the same position in the block body 2' in the vertical direction.

Next, referring to FIGS. 8 and 9, the manifold 2, which is formed by machining the block body 2', will be described.

The plurality of valve holes 6 are formed in the manifold 2 so as to straightly extend through the manifold 2 in the transverse direction. The plurality of valve holes 6 are disposed at positions in the manifold 2 that are substantially the same as each other in the vertical direction at a regular pitch so as to be parallel to each other. Each of the valve holes 6 communicates with the fluid supply hole 4 and the fluid discharge holes 5A and 5B by directly intersecting the long hole portions 4b and 5b of the fluid supply hole 4 and the fluid discharge holes 5A and 5B. The long hole portion 4b of the fluid supply hole 4 and the long hole portions 5b of the fluid discharge holes 5A and 5B intersect the valve holes 6 from directions opposite to each other. That is, the long hole portion 4b of the fluid supply hole 4 intersects the valve holes 6 from below the valve holes 6, and the long hole portions 5b of the fluid discharge holes 5A and 5B intersect the valve holes 6 from above the valve holes 6. The vertical length H4 of portions where the long hole portion 4b of the fluid supply hole 4 intersects the valve holes 6 and the vertical length H5 of portions where the long hole portions 5b of the fluid discharge holes 5A and 5B intersect the valve holes 6 are each smaller than the inside diameter D of the valve holes 6. Therefore, at positions where the long hole portions 4b and 5b intersect the valve holes 6, arc-shaped recesses 14, whose diameter is larger than the inside diameter of the valve holes 6, are formed so as to be coaxial with the valve holes 6.

As described above, by forming the valve holes 6 at positions where the valve holes 6 directly intersect the fluid supply hole 4 and the fluid discharge holes 5A and 5B, compared with a case where the valve holes 6 are formed at positions separated from the fluid supply hole 4 and the fluid discharge holes 5A and 5B in the vertical direction and made to communicate with the flow path holes through communication holes, the height of the manifold 2, that is, the width of the manifold 2 in the vertical direction can be considerably reduced, and the manifold valve 1A can be reduced in size. Moreover, compared with a case where a manifold and valves that have been individually formed are joined, not only the entirety of the manifold valve can be remarkably reduced is size but also the manifold valve can be considerably reduced in weight because gaskets and bolts for joining are not necessary at all.

Figure 5:
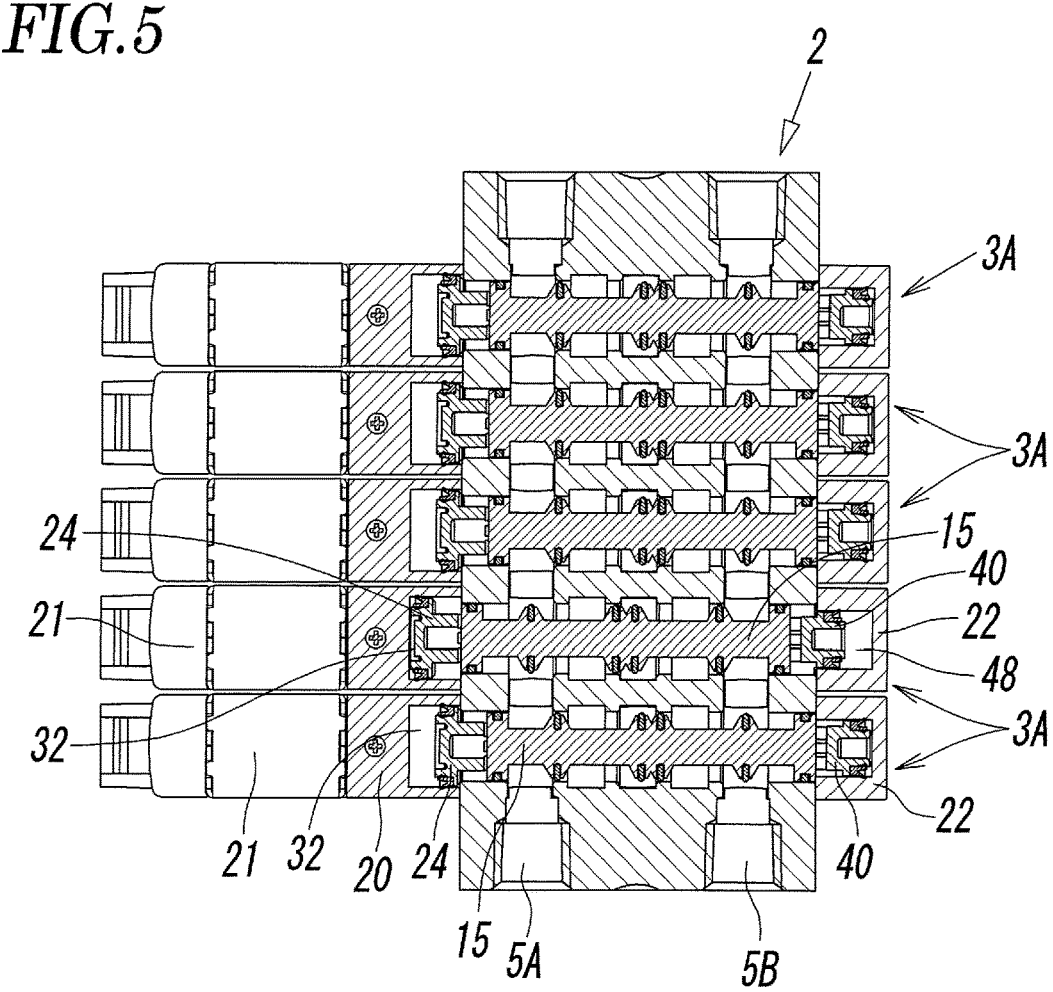
FIG. 5 is a sectional view taken along line V-V of FIG. 3.
Figure 4:
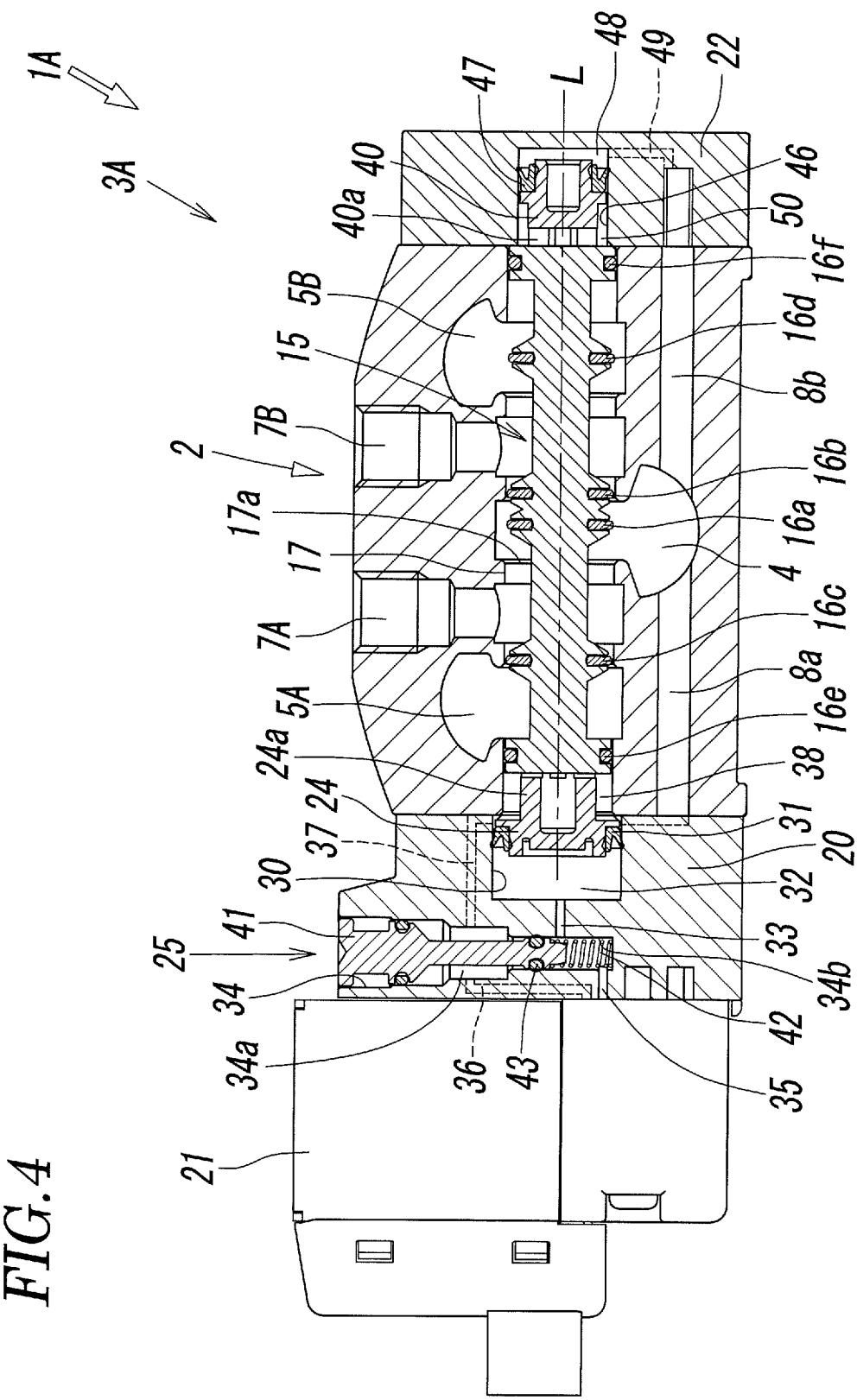
FIG. 4 is a sectional view taken along line IV-IV of FIG. 2.

Furthermore, by forming the valve holes 6 so as to cross the long hole portions 4b and 5b of the fluid supply hole 4 and the fluid discharge holes 5A and 5B, side edges 17a of valve seats 17, onto which sealing members 16a to 16d move during an operation of switching spools 15 that are inserted into the valve holes 6 as illustrated in FIGS. 4 and 5, can be formed on planes that are perpendicular to the central axes L of the valve holes 6.

In the example shown in the figures, five valve holes 6 are formed. However, the number of the valve holes 6 is not limited to five, and may be appropriately increased or decreased in accordance with the number of the valve mechanisms 3A to be incorporated.

The plurality of output ports 7A and 7B, which individually communicate with the plurality of valve holes 6, are formed in the upper surface of the manifold 2. In the example shown in the figures, for each of the valve holes 6, two output ports 7A and 7B are disposed adjacent to each other along the valve hole 6 in the transverse direction of the manifold 2. A first output port 7A, which is one of the output ports, communicates with the valve hole 6 at a position between the fluid supply hole 4 and a first fluid discharge hole 5A. A second output port 7B, which is the other output port, communicates with the valve hole 6 at a position between the fluid supply hole 4 and a second fluid discharge hole 5B.

The output ports 7A and 7B may be formed in the lower surface of the manifold 2 or may be formed in both of the upper surface and the lower surface. If the output ports 7A and 7B are formed in both of the upper surface and the lower surface, the output ports 7A and 7B in one of the surfaces are selectively used, and the output ports 7A and 7B in the other surface are closed with plugs or the like.

In both end portions of the manifold 2 in the longitudinal direction, at both end portions of the fluid supply hole 4 and the fluid discharge holes 5A and 5B, the pipe connection holes 9a and 9b, which are circular screw holes for connecting pipes, are formed so as to be coaxial with the imaginary cylindrical surfaces C1 and C2. Pipes are connected to the manifold 2 by screwing joints, which are joined to end portions of the pipes, into the pipe connection holes 9a and 9b. When pipes are not connected to the pipe connection hole 9a or 9b at one ends of the fluid supply hole 4 and the fluid discharge holes 5A and 5B, the pipe connection hole 9a or 9b are closed with plugs.

The inside diameter of the pipe connection holes 9a and 9b are each the same as or larger than the diameter of the imaginary cylindrical surfaces C1 and C2.

The pilot supply holes 8a and 8b extend from the fluid supply hole 4 in the manifold 2 in the transverse direction. An end of a first pilot supply hole 8a, which is one of the pilot supply holes, is open in one side surface of the manifold 2, and an end of a second pilot supply hole 8b, which is the other pilot supply hole, is open in the other side surface of the manifold 2.

Figure 1:
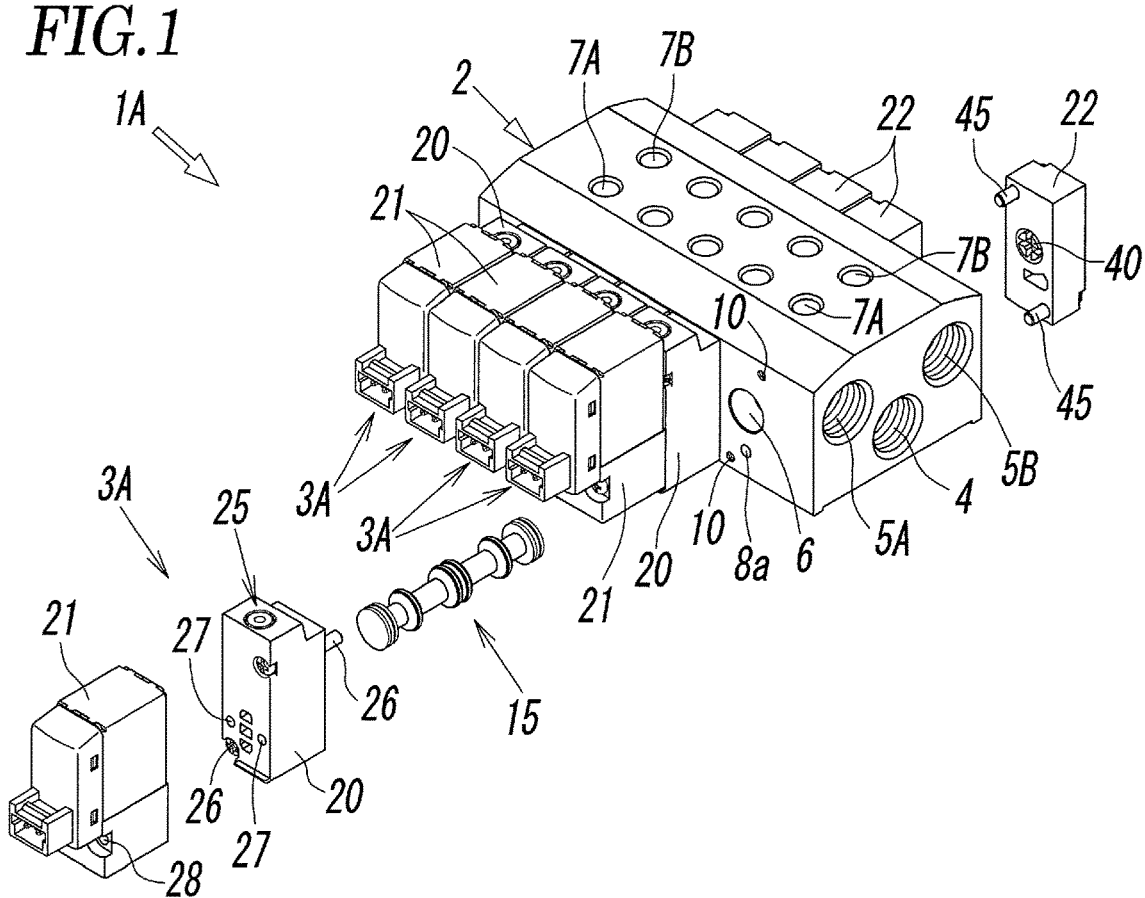
FIG. 1 is a perspective view of an integrated multiple valve manifold according to a first embodiment of the present invention, in which some valve mechanisms are disassembled.
Figure 2:
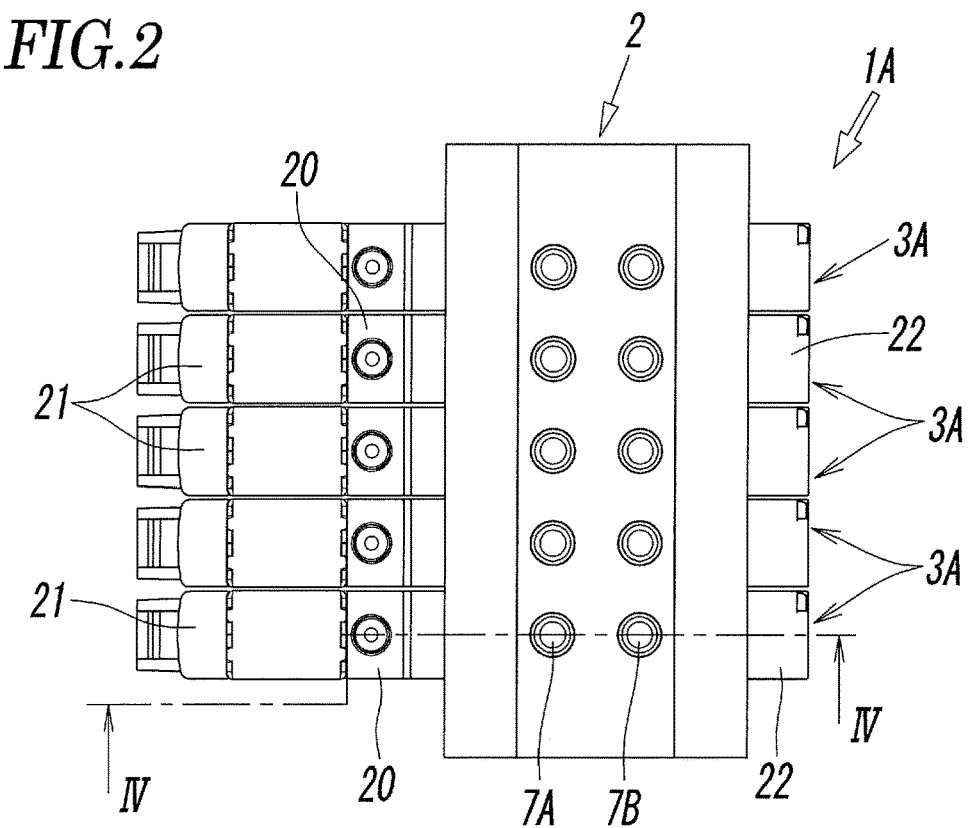
FIG. 2 is a plan view of the manifold valve of FIG. 1 in a fully assembled state.
Figure 3:
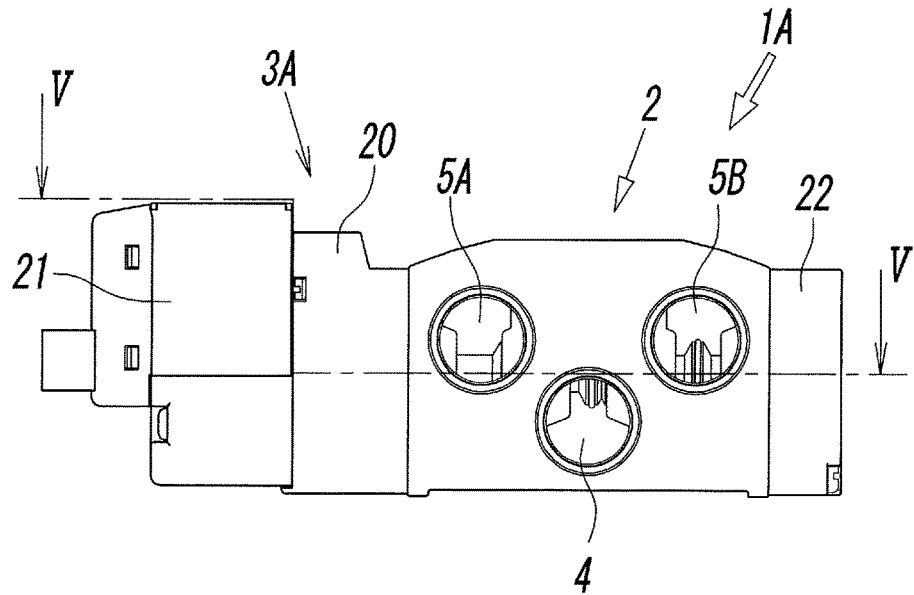
FIG. 3 is a front view of FIG. 2.

When forming the manifold valve 1A by using the manifold 2, as is clear from FIGS. 1, 4, and 5, the spools 15 are slidably inserted into the valve holes 6 respectively, pilot valves 21 are attached to one end portions of the valve holes 6 via adapter plates 20, and end plates 22 are attached to the other end portions of the valve holes 6.

Each of the spools 15 include a first sealing member 16a that opens or closes a flow path that connects the fluid supply hole 4 and the first output port 7A, a second sealing member 16b that opens or closes a flow path that connects the fluid supply hole 4 and the second output port 7B, a third sealing member 16c that opens or closes a flow path that connects the first output port 7A and the first fluid discharge hole 5A, a fourth sealing member 16d that opens or closes a flow path that connects the second output port 7B and the second fluid discharge hole 5B, and a fifth sealing member 16e and a sixth sealing member 16f that always close both ends of the valve hole 6.

Each of the adapter plates 20 is a block-shaped member that is elongated in the vertical direction of the manifold 2 and includes a drive piston 24 and a manual operation mechanism 25. The adapter plate 20 is fixed to the manifold 2 with an attachment screw 26 that is screwed into the screw hole 10 in a side surface of the manifold 2. The pilot valve 21 is fixed to an outer surface of the adapter plate 20 with an attachment screw 28 that is screwed into a screw hole 27 of the adapter plate 20.

The drive piston 24 is disposed in a piston chamber 30 of the adapter plate 20 so as to be slidable in the direction of the axis L via a lip sealing member 31 attached to an outer periphery of the drive piston 24. A leg portion 24a, which is formed on an end surface facing the spool 15, is in contact with an end surface of the spool 15. A back surface of the drive piston 24 faces a drive pressure chamber 32 formed in the piston chamber 30.

The drive pressure chamber 32 is connected from a pilot communication hole 33 to the first pilot supply hole 8a through a lower half 34b of an operation member hole 34 of the manual operation mechanism 25, a pilot output hole 35, the pilot valve 21, a pilot input hole 36, an upper half 34a of the operation member hole 34 of the manual operation mechanism 25, and a pilot relay hole 37.

A space 38 between the drive piston 24 and the end surface of the spool 15 is open to the atmosphere through a communication hole (not shown).

The pilot valve 21 is a three-port electromagnetic valve. When the pilot valve 21 is energized, the pilot input hole 36 and the pilot output hole 35 communicate with each other. As a result, pilot fluid from the first pilot supply hole 8a flows from the pilot communication hole 33 into the drive pressure chamber 32, and the drive piston 24 moves rightward as shown in FIG. 4 and the spool 15 is switched to a first position. At this time, the fluid supply hole 4 and the first output port 7A communicate with each other, the second output port 7B and the second fluid discharge hole 5B communicate with each other, the flow path that connects the fluid supply hole 4 and the second output port 7B is shut off by the second sealing member 16b, and the flow path that connects the first output port 7A and the first fluid discharge hole 5A is shut off by the third sealing member 16c.

When the pilot valve 21 is de-energized, pilot fluid in the drive pressure chamber 32 is discharged through the pilot valve 21. Therefore, the spool 15 and the drive piston 24 are pushed by a recovery piston 40 disposed in the end plate 22 and moved leftward in FIG. 4 and occupy a return position. The details of this point will be described below.

During an electric power failure, a maintenance operation, or the like, the manual operation mechanism 25 is used to realize, with a manual operation performed on an operation member 41, the same state as when the pilot valve 21 is energized. The operation member 41 is disposed so that the operation member 41 can be depressed into the operation member hole 34. The operation member 41 is always urged upward in the figures by a force of a return spring 42 and normally occupies a non-operation position shown in the figures. At this time, an O-ring 43, which is attached to the outer periphery of the operation member 41, separates the lower half 34b and the upper half 34a of the operation member hole 34 from each other.

When the operation member 41 is depressed from this state, the O-ring 43 moves downward beyond the pilot communication hole 33. As a result, the lower half 34b and the upper half 34a of the operation member hole 34 communicate with each other, pilot fluid from the pilot supply hole 8a directly flows from the pilot communication hole 33 into the drive pressure chamber 32 through the operation member hole 34, and the drive piston 24 is moved.

Each of the end plates 22, which is attached to the other end portion of the valve hole 6, is a block-shaped member that is elongated in the vertical direction as with the adapter plate 20. As with the adapter plate 20, the end plate 22 is fixed to the manifold 2 by screwing an attachment screw 45 into a screw hole in a side surface of the manifold 2.

The recovery piston 40 is disposed in a piston chamber 46 of the end plate 22 so as to be slidable in the direction of the axis L via a lip sealing member 47 attached to an outer periphery of the recovery piston 40. A leg portion 40a, which is formed on an end surface facing the spool 15, is in contact with an end surface of the spool 15. A back surface of the recovery piston 40 faces a recovery pressure chamber 48 formed in the piston chamber 46. The recovery pressure chamber 48 always communicates with the second pilot supply hole 8b of the manifold 2 through a pilot relay hole 49 formed in the end plate 22, so that pilot fluid is always supplied from the fluid supply hole 4.

A space 50 between the recovery piston 40 and an end surface of the spool 15 is open to the atmosphere through a communication hole (not shown).

The diameter of the recovery piston 40 is smaller than that of the drive piston 24. Accordingly, when the pilot valve 21 is energized and pilot fluid is supplied to the drive pressure chamber 32 and acting on the drive piston 24, due to difference in fluid pressure that occurs due the difference between the pressure-receiving areas of the pistons 24 and 40, the spool 15 moves to a switching position shown in FIG. 4 and maintains the position. When the pilot valve 21 is de-energized, pilot fluid in the drive pressure chamber 32 is discharged to the outside through the pilot valve 21. Therefore, the spool 15 is pushed leftward in FIG. 4 by a force exerted by the recovery piston 40 and moves to the return position. The state is shown by the second lowest valve mechanism 3A in FIG. 5. At this time, the fluid supply hole 4 and the second output port 7B communicate with each other, the first output port 7A and the first fluid discharge hole 5A communicate with each other, the flow path that connects the fluid supply hole 4 and the first output port 7A is shut off by the first sealing member 16a, and the flow path that connects the second output port 7B and the second fluid discharge hole 5B is shut off by the fourth sealing member 16d.

Accordingly, with each of the valve mechanisms 3A, by energizing or de-energizing the one pilot valve 21, the spool 15 can be switched between the first position and the return position and thereby communication states of the ports can be switched over.

In the embodiment shown in the figures, the adapter plates 20 and the pilot valves 21 of all of the valve mechanisms 3A are attached to one side surface of the manifold 2, and the end plates 22 of all of the valve mechanisms 3A are attached to the other side surface. However, the disposition of the adapter plates 20, the pilot valves 21, and the end plates 22 of some of the valve mechanisms 3A may be opposite to that of the other valve mechanisms 3A. In order to allow the adapter plate 20 and the end plate 22 to be attached to either of the left side surface and the right side surface of the manifold 2, for the left side surface and the right side surface, the positional relationship among the valve hole 6, the pilot supply holes 8a and 8b, and the screw hole 10 in the manifold 2 is the same; the disposition of the attachment screw 26 and the pilot relay hole 37 in the adapter plate 20 is the same; and the disposition of the attachment screw 45 and the pilot relay hole 49 in the end plate 22 is the same.

In the manifold valve 1A according to the first embodiment, all of the valve mechanisms 3A are single-solenoid-type valve mechanisms each including one pilot valve 21. However, as in a manifold valve 1B according to a second embodiment illustrated in FIG. 10, the single-solenoid-type valve mechanisms 3A and double-solenoid-type valve mechanisms 3B, each including two pilot valves 21, may be intermixedly incorporated in the manifold 2. Alternatively, all of the valve mechanisms may be double-solenoid-type valve mechanisms.

Figure 11:
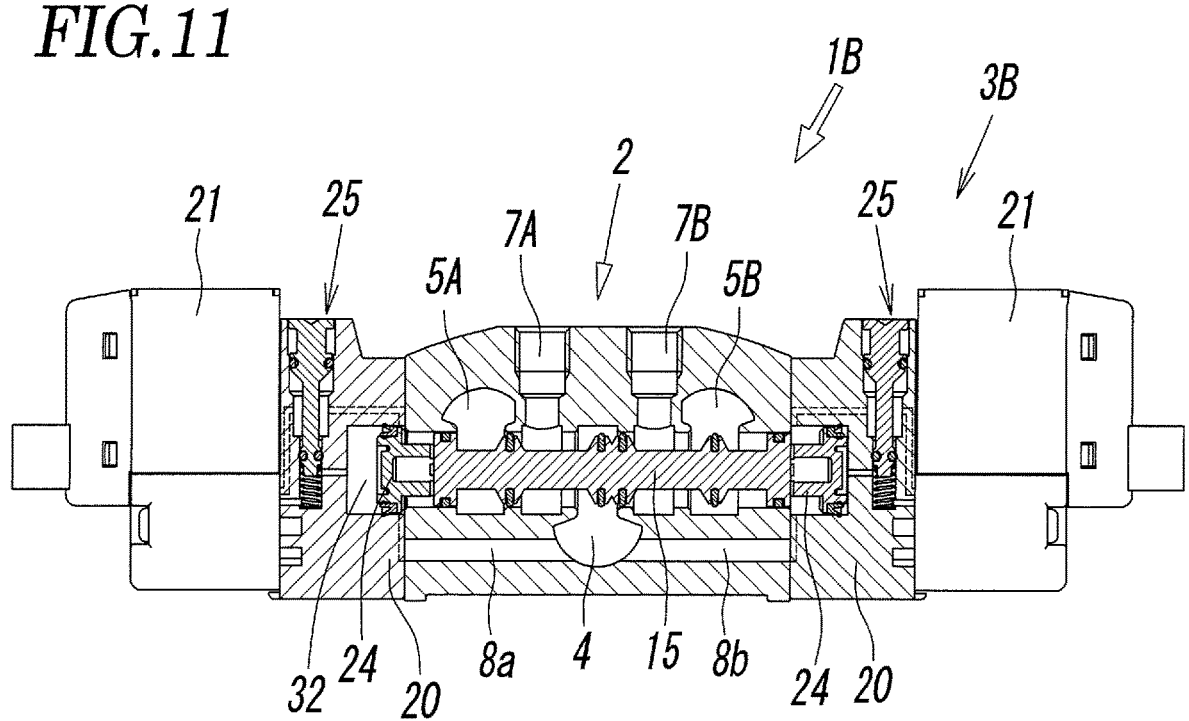
FIG. 11 is a sectional view of the manifold valve of FIG. 10 that is cut at the position of a central valve mechanism.

As illustrated in FIG. 11, each of the double-solenoid-type valve mechanisms 3B includes the pilot valves 21 that are attached to both side surfaces of the manifold 2 in the transverse direction via adapter plates 20. The structures of the adapter plate 20 and the pilot valve 21 that are attached to one side surface of the manifold 2 and the structures of the adapter plate 20 and the pilot valve 21 that are attached to the other side surface are the same as each other.

In FIG. 11, the structures of the manifold 2 and the spool 15 are substantially the same as those of the first embodiment shown in FIG. 4. Therefore, main elements of these embodiments that are the same will be denoted by the same numerals as in FIG. 4 and descriptions of such elements will be omitted.

The double-solenoid-type valve mechanism 3A switches the spool 15 by controlling the two pilot valves 21 so as to alternately energize and de-energize the two pilot valves 21.

Figure 10:
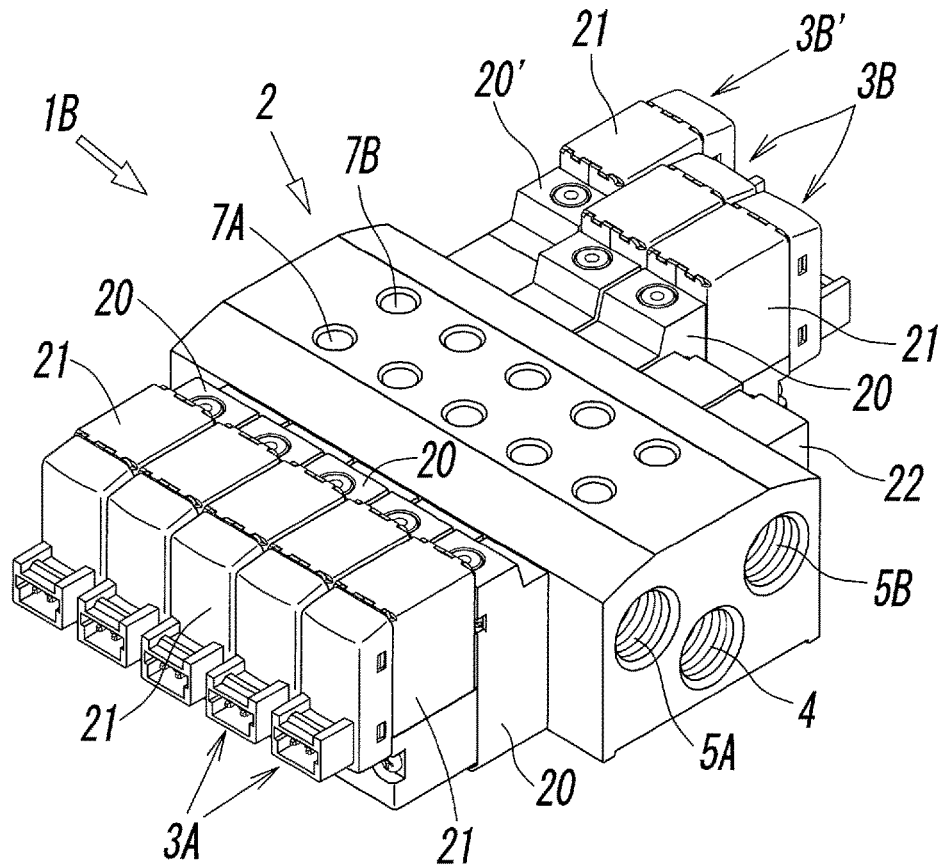
FIG. 10 is a perspective view of an integrated multiple valve manifold according to a second embodiment of the present invention.

In FIG. 10, a double-solenoid-type valve mechanism 3B', which is incorporated in the left uppermost portion of the manifold 2, is a three-position valve in which a spool has three switching positions. The valve mechanism 3B' is configured so that, when both of two pilot valves 21 are not energized, the spool returns to a neutral position due to a return spring (not shown) disposed in an adapter plate 20' of one of the pilot valves 21. The structure of such a three-position valve, which is known, will not be described here.

Except for the valve mechanism 3B', each of the valve mechanisms 3A and 3B is a two-position valve in which a spool has two switching positions.

Figure 12:
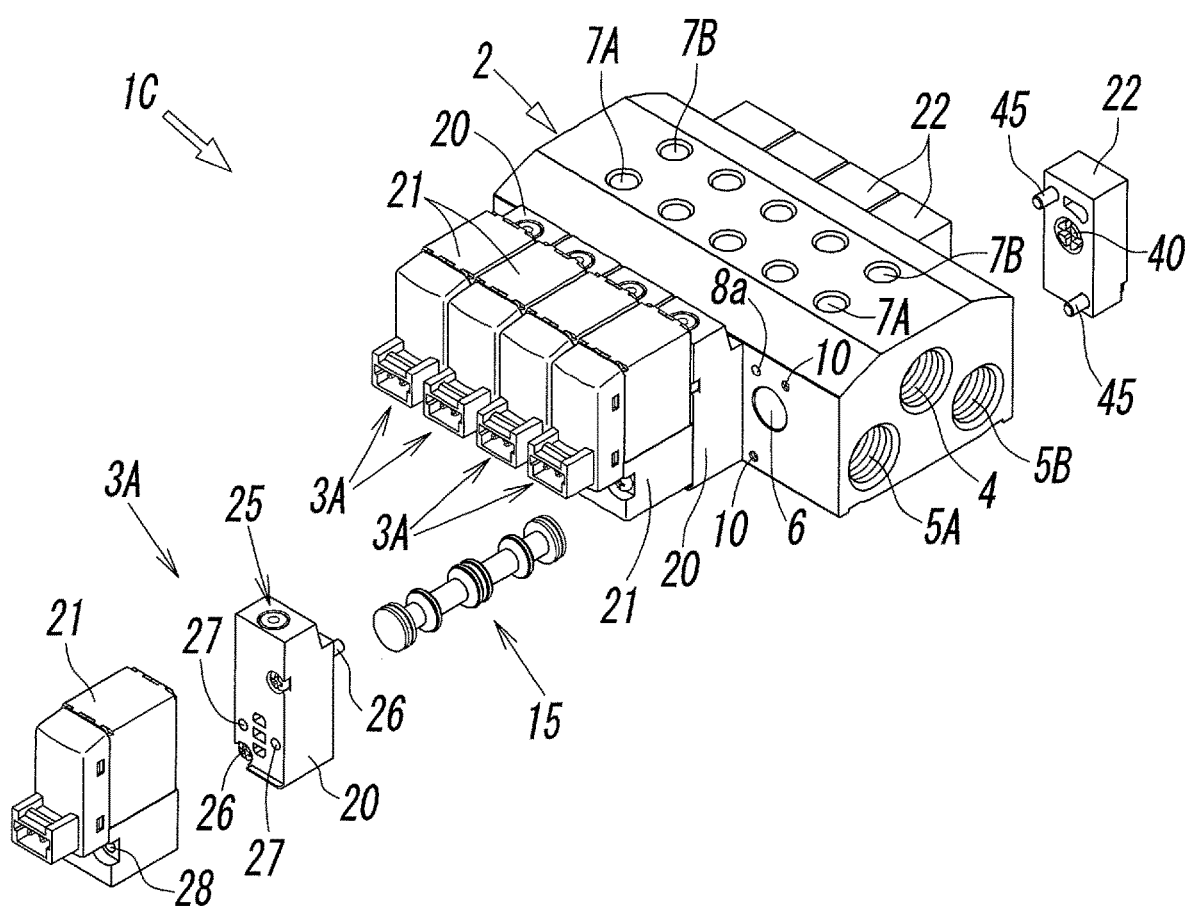
FIG. 12 is a perspective view of an integrated multiple valve manifold according to a third embodiment of the present invention, in which some valve mechanisms are disassembled.
Figure 13:
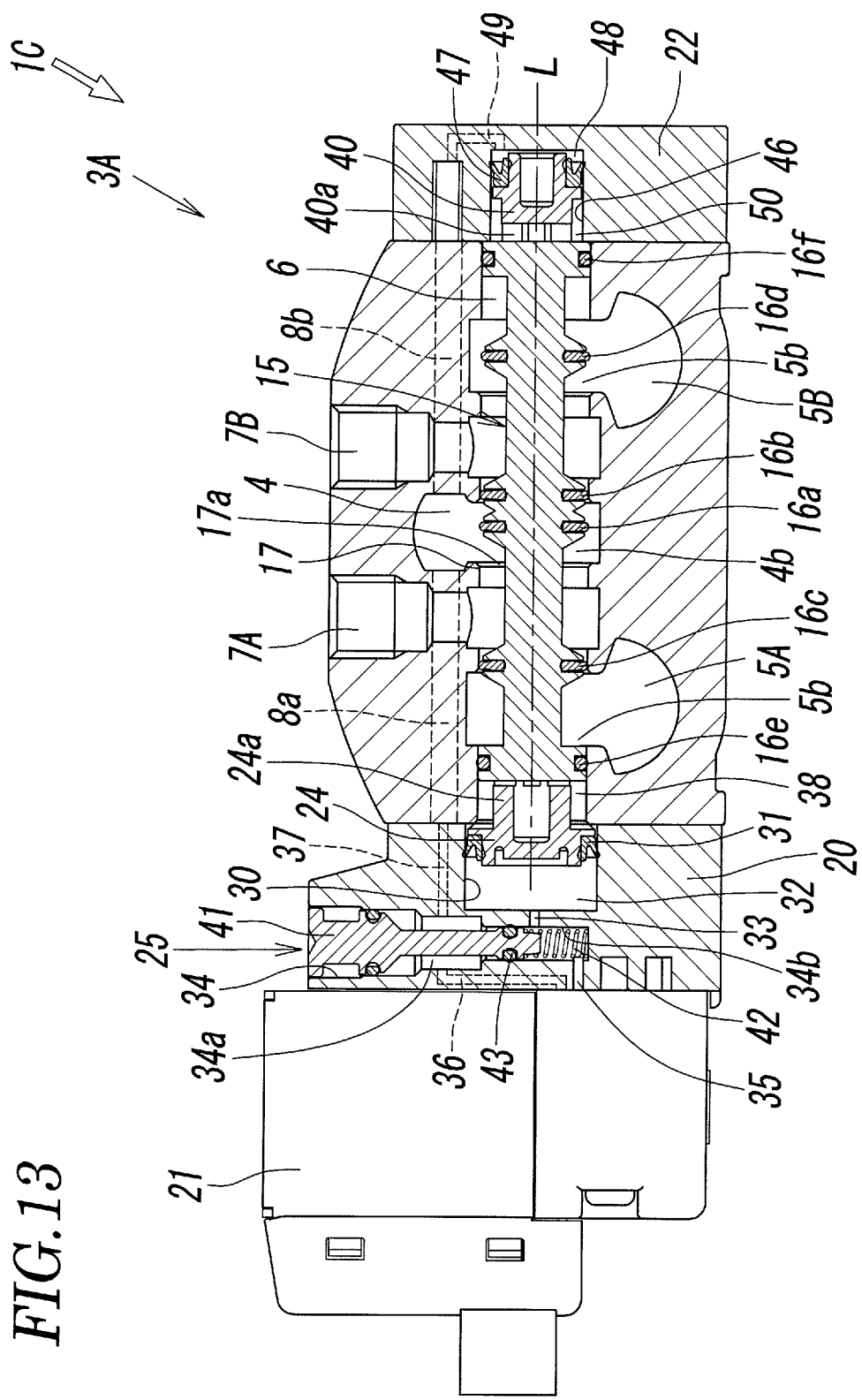
FIG. 13 is a sectional view of the manifold valve according to the third embodiment that is cut at a position similar to that of FIG. 4.

FIGS. 12 and 13 illustrate a manifold valve according to a third embodiment of the present invention. In a manifold valve 1C according to the third embodiment, the fluid supply hole 4 is formed in the manifold 2 so as to occupy a position higher than those of the two fluid discharge holes 5A and 5B in the vertical direction.

Accordingly, in the manifold valve 1C, the long hole portion 4b of the fluid supply hole 4 intersects the valve holes 6 from above the valve holes 6, the long hole portions 5b of the two fluid discharge holes 5A and 5B intersect the valve holes 6 from below the valve holes 6, and the pilot supply holes 8a and 8b are formed at positions in the manifold 2 higher than the valve holes 6.

Since the third embodiment is substantially the same as the first embodiment except for the structures described above, elements of the third embodiments corresponding to those of the first embodiment will be denoted by the same numerals and descriptions of such elements will be omitted.

In each of the embodiments described above, the valve mechanisms are five-port valves. However, the valve mechanisms may be four-port valves or three-port valves. When the valve mechanisms are four-port valves, two fluid discharge holes 5A and 5B communicate with each other in the manifold 2, both end portions of one of the fluid discharge holes 5A and 5B are closed with plugs, and only the other of the fluid discharge holes 5A and 5B is used. When the valve mechanisms 3A and 3B are three-port valves, the number of the fluid discharge hole and the number of the output port are each one.

REFERENCE SIGNS LIST 1A, 1B, 1C manifold valve
2 manifold
4 fluid supply hole
4b long hole portion
5A, 5B fluid discharge hole
5b long hole portion
6 valve hole
7A, 7B output port
14 recess
15 spool
20 adapter plate
21 pilot valve
22 end plate
24 drive piston
32 drive pressure chamber
40 recovery piston
48 recovery pressure chamber
X longitudinal direction
Y transverse direction
Z vertical direction
W4, W5 hole width
H4, H5 vertical length
D inside diameter of valve hole

The invention claimed is:

1. An integrated multiple valve manifold comprising:
one manifold that is formed of an extruded material through which a fluid supply hole and a fluid discharge hole extend, the manifold having a longitudinal direction in which the fluid supply hole and the fluid discharge hole extend, a transverse direction perpendicular to the longitudinal direction, and a vertical direction perpendicular to both of the longitudinal direction and the transverse direction;
a plurality of valve holes that extend through the manifold in the transverse direction, each of the plurality of valve holes directly communicating with the fluid supply hole and the fluid discharge hole by intersecting both of the fluid supply hole and the fluid discharge hole;
output ports that are formed in at least one of an upper surface and a lower surface of the manifold so as to individually communicate with the plurality of valve holes;
spools that are slidably inserted into the plurality of valve holes respectively and switch flow paths that connect the output ports, the fluid supply hole, and the fluid discharge hole; and
electromagnetic pilot valves that are individually attached to one or both ends of the valve holes to drive the spools,
wherein the fluid supply hole and the fluid discharge hole of the manifold have a non-circular cross-sectional shape and each include a long hole portion having a constant hole width in a part of a cross section;
wherein the long hole portion of the fluid supply hole and the long hole portion of the fluid discharge hole intersect the valve holes; and
wherein vertical lengths of portions where the long hole portions of the fluid supply hole and the fluid discharge hole intersect each of the valve holes are each smaller than an inside diameter of the valve hole.

2. The manifold valve according to claim 1, wherein the fluid supply hole and the fluid discharge hole are formed at positions that are different from each other in the vertical direction of the manifold, and the long hole portion of the fluid supply hole and the long hole portion of the fluid discharge hole extend opposite to each other in the vertical direction of the manifold, and intersect the valve holes from directions vertically opposite to each other.

3. The manifold valve according to claim 2, wherein, at positions where the long hole portions of the fluid supply hole and the fluid discharge hole intersect each of the valve holes, arc-shaped recesses having a diameter larger than the inside diameter of the valve hole are formed so as to be coaxial with the valve hole.

4. The manifold valve according to claim 1, wherein the electromagnetic pilot valves are attached to a side surface of the manifold via adapter plates, the adapter plates include drive pistons that are in contact with end portions of the spools and drive pressure chambers that cause pilot fluid to act on the drive pistons, and the drive pressure chambers are connected to the fluid supply hole via the electromagnetic pilot valves.

5. The manifold valve according to claim 4, wherein at least one of the valve holes includes an electromagnetic pilot valve of the electromagnetic pilot valves attached to one end of the at least one of the valve holes and an end plate attached to an other end of the at least one of the valve holes, the end plate includes a recovery piston that is in contact with the ends portion of the spool and a recovery chamber that causes pilot fluid to act on the recovery piston, the recovery piston has a diameter smaller than a diameter of the drive piston, and the recovery pressure chamber always communicates with the fluid supply hole.

\* \* \* \* \*